(12) United States Patent
Green (10) Patent No.: US 11,553,701 B1
(45) Date of Patent: Jan. 17, 2023

(54) RATTLE INSERTION DEVICE FOR ELASTOMERIC FISHING LURE AND METHOD OF USE

(71) Applicant: Oliver Green, Boca Raton, FL (US)

(72) Inventor: Oliver Green, Boca Raton, FL (US)

(*) Notice: Subject to any disclaimer, the term of this patent is extended or adjusted under 35 U.S.C. 154(b) by 2 days.

(21) Appl. No.: 17/372,718

(22) Filed: Jul. 12, 2021

(51) Int. Cl.
| | | |
|---|---|---|
| *A01K 85/01* | (2006.01) | |
| *G10K 3/00* | (2006.01) | |
| *B25B 33/00* | (2006.01) | |
| *A01K 97/04* | (2006.01) | |
| *B25B 27/14* | (2006.01) | |
| *B26F 1/32* | (2006.01) | |

(52) U.S. Cl.
CPC .......... *A01K 85/017* (2022.02); *A01K 97/045* (2013.01); *B25B 27/14* (2013.01); *B25B 33/00* (2013.01); *G10K 3/00* (2013.01); *B26F 1/32* (2013.01)

(58) Field of Classification Search
CPC .. A01K 85/011; A01K 85/017; A01K 97/045; B25B 27/14; B25B 33/00; B26F 1/32
See application file for complete search history.

(56) References Cited

U.S. PATENT DOCUMENTS

| | | | |
|---|---|---|---|
| 2,213,290 A | 9/1940 | Rowe | |
| 3,802,115 A * | 4/1974 | Auten | ........................... A01K 85/01 43/42.31 |
| 4,086,914 A | 5/1978 | Moore | |
| 4,203,246 A * | 5/1980 | Sacharnoski, Sr. | .... A01K 85/01 43/42.31 |
| 4,659,326 A | 4/1987 | Johnson et al. | |
| 4,673,387 A | 6/1987 | Phillips et al. | |
| 4,936,827 A | 6/1990 | Grimm et al. | |
| 5,106,370 A | 4/1992 | Stewart | |
| 5,279,555 A | 1/1994 | Lifshey | |
| 5,930,937 A * | 8/1999 | Bowersock | ........... A01K 85/01 43/4.5 |
| 6,436,068 B1 | 8/2002 | Bardy | |
| 6,648,849 B2 | 11/2003 | Tenhuisen et al. | |
| 8,323,232 B2 | 12/2012 | Bardy | |
| 9,288,974 B2 * | 3/2016 | Alguire | .................. A01K 95/02 |
| 10,391,291 B2 | 8/2019 | Wallace et al. | |
| 10,660,320 B2 * | 5/2020 | Bailey | .................... A01K 85/01 |
| 2010/0123271 A1 | 5/2010 | Hobbins | |

* cited by examiner

*Primary Examiner* — Richard G Davis
(74) *Attorney, Agent, or Firm* — Mark C. Johnson; Johnson Dalal (57) ABSTRACT

A rattle insertion device and method for inserting a rattle into an elastomeric fishing lure that includes having a push rod member with an insertion rod portion, a needle member with a second needle end operably configured to puncture an elastomeric lure and that defines a needle channel with a channel diameter greater than a rod diameter and a needle opening disposed along the needle length. Additionally, the device and method include having a rattle member with a rigid rattle member, sized to be inserted within the needle channel, and that defines a rattle cavity encapsulating one or more rigid noise particle therein that are operably configured to be freely mobile therein. The push rod member is operably configured to translate within the needle channel along a rod translation path to transport the rattle member through the needle channel and out through the needle opening.

16 Claims, 5 Drawing Sheets 3-3

RATTLE INSERTION DEVICE FOR ELASTOMERIC FISHING LURE AND METHOD OF USE

FIELD OF THE INVENTION

The present invention relates generally to fishing lures and, more particularly, relates to methods and devices for inserting a rattle within a fishing lure.

BACKGROUND OF THE INVENTION

Many users around the world fish with a lure to attract and/or catch fish. Specifically, a fishing lure is a type of artificial fishing bait which is designed to attract a fish's attention. The lure uses movement, vibration, flash and color to bait fish. Many lures are equipped with one or more hooks that are used to catch fish when they strike the lure. Some lures are placed to attract fish so a spear can be impaled into the fish or so the fish can be captured by hand. Most lures are attached to the end of a fishing line and have various styles of hooks attached to the body and are designed to elicit a strike resulting in a hookset. Many lures are commercially made but some are handmade. One type of fishing lure is an elastomeric material such as rubber. Furthermore, many users desire to utilize what is known as a "rattle" with a fishing lure, whereby the rattle generates sound that might be similar to the sounds created by actual live creatures. Inserting a rattle into an elastomeric lure, however, comes with many challenges.

Specifically, some known devices and methods of coupling a rattle with an elastomeric lure include prefabricating the lure with the rattle inside, a methodology that typically results in a higher-priced and less versatile lure. Additional devices and methods include using adhesive, which is prone to dislodgement or degradation when utilized and is time-intensive and messy to couple and/or decouple the rattle to the lure. Some known lures also include prefabricated pockets or holes shaped and sized to receive a rattle. These prefabricated lures fail to accommodate various sizes of rattles, fail to sufficient retain the rattle, are also prone to dislodgment of the rattle, and are also time-intensive to couple and uncouple the rattle to and from the lure.

One potential device and method of coupling a rattle with an elastomeric lure may include utilizing a needle to make a hole or channel into the lure for insertion of the rattle. These devices and methods are problematic, however, as the created hole in the lure often closes after removal of the needle. As such, utilizing this device and method is time-consuming and cumbersome. Some known devices also include rattles with a pointed end, wherein the user typically inserts said pointed rattle into the lure with manual force. For some materials this does method works, but the accuracy and the required strength can be an issue. With other materials that have a very high elasticity, it is almost impossible to insert said pointed rattles therein with utilizing unsafe techniques like a heated icepick or screwdriver.

Therefore, a need exists to overcome the problems with the prior art as discussed above.

SUMMARY OF THE INVENTION

The invention provides a rattle insertion device for elastomeric fishing lure and method of use that overcomes the hereinafore-mentioned disadvantages of the heretofore-known devices and methods of this general type and that effectively and efficiently enable users to insert a rattle into an elastomeric lure.

A method of inserting a rattle into an elastomeric fishing lure. Specifically, the method includes providing a needle with a base/handle and defining a lumen and a beveled opening disposed at the distal tip thereof and a cannula/push rod operably configured to be inserted and removed from the lumen. The method includes inserting the distal tip of the needle into an end of the elastomeric fishing lure to a desired distance and then inserting the rattle, or a container having one or more metallic elements operably configured to move therein, into the lumen of the needle and then inserting the cannula/push rod into the lumen until the rattle is ejected into the lure and then removing the distal end of the needle from the lure With the foregoing and other objects in view, there is provided, in accordance with the invention, a rattle insertion device for an elastomeric fishing lure that includes a push rod member with a first rod end, a second rod end opposing the first rod end, a rod member length separating the first and second rod ends, a rod outer surface, an insertion rod portion disposed along the rod member length, having a rod diameter separating opposing sides of the rod outer surface, and including the second rod end. Additionally, a needle member is utilized with a first needle end, a second needle end opposing the first needle end, a needle wall defining a needle channel with a channel diameter greater than the rod diameter, a needle length separating the first and second needle ends, and a needle opening disposed along the needle length. A rattle member is disposed within the needle channel, includes a rigid rattle member wall having a rattle outer surface, having a rattle diameter separating opposing sides of the rattle outer surface and less than the channel diameter and the needle opening, and defining a rattle cavity encapsulating at least one rigid noise particle therein and operably configured to be freely mobile. The push rod member is operably configured to translate within the needle channel along a rod translation path to transport the rattle member through the needle channel and out through the needle opening.

In accordance with a further feature of the present invention, the needle opening is disposed at the terminal portion of the second needle end and the second needle end defines a tapered point.

In accordance with another feature, an embodiment of the present invention includes the push rod member having a handle member shaped and sized for grasping and defining an internal channel with the first rod end and a portion of the rod length disposed therein, the push rod member securely coupled to the handle member.

In accordance with yet another feature, an embodiment of the present invention includes a handle member securely coupled to the handle member and having a first handle end, a second handle end opposing the first handle end, and a handle length separating the first and second handle end and a needle adapter body securely coupled to the needle member and having a first adapter end, a second adapter end opposing the first adapter end, and an adapter length separating the first and second adapter ends, wherein the second handle end and the first adapter end operably configured to be directly and matingly coupled to one another in a male-female configuration.

In accordance with a further feature of the present invention, the second handle end is configured in a male configuration, the first adapter end is configured in a female configuration, and the needle adapter body defines a tapered insertion channel spanning from the first adapter end and along the adapter length.

In accordance with an additional feature, an embodiment of the present invention also includes an internal diameter of the tapered insertion channel less than a diameter of the second handle end.

In accordance with yet another feature, an embodiment of the present invention also includes a handle member securely coupled to the handle member and having a first handle end, a second handle end opposing the first handle end, a handle length separating the first and second handle ends, wherein the insertion rod portion spanning from the second handle end to the second rod end to define a rod insertion length sufficient to reach the needle opening.

In accordance with an exemplary feature of the present invention, the rod insertion length is greater than or equal to a total needle opening length separating the first needle end and the terminal portion of the needle opening.

In accordance with yet an additional feature, an embodiment of the present invention also includes a needle adapter body securely coupled to the needle member and having a first adapter end, a second adapter end opposing the first adapter end, and an adapter length separating the first and second adapter ends, wherein the rod insertion length is greater than or equal to a total needle opening length separating the first adapter end and the terminal portion of the needle opening.

In accordance with a further feature of the present invention, the second handle end and the first adapter end are operably configured to be directly and matingly coupled to one another in a male-female configuration.

In accordance with yet an additional feature, an embodiment of the present invention also includes the rattle member having a plurality of rigid noise particles encapsulated within the rattle cavity, wherein the rattle member is of an elongated shape.

Also in accordance with the present invention, a method of inserting a rattle into an elastomeric fishing lure is disclosed that includes providing a push rod member with a first rod end, a second rod end opposing the first rod end, a rod member length separating the first and second rod ends, a rod outer surface, and an insertion rod portion disposed along the rod member length and including the second rod end, in addition to providing a needle member with a first needle end, a second needle end opposing the first needle end, a needle wall defining a needle channel, a needle length separating the first and second needle ends, and a needle opening disposed along the needle length. Additionally, the method includes inserting a rattle member within the needle channel, the rattle member having a rigid rattle member wall with a rattle outer surface and defining a rattle cavity encapsulating at least one rigid noise particle therein and operably configured to be freely mobile. The method includes inserting the second needle end and needle opening within the body of an elastomeric lure and inserting the second rod end into the needle channel to transport the rattle member through the needle channel, out through the needle opening, and into the body of the elastomeric lure. The method also includes removing the second needle end and needle opening from within the body of the elastomeric lure.

Although the invention is illustrated and described herein as embodied in a rattle insertion device for an elastomeric fishing lure, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the push rod member and/or needle member (as depicted in the figures).

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
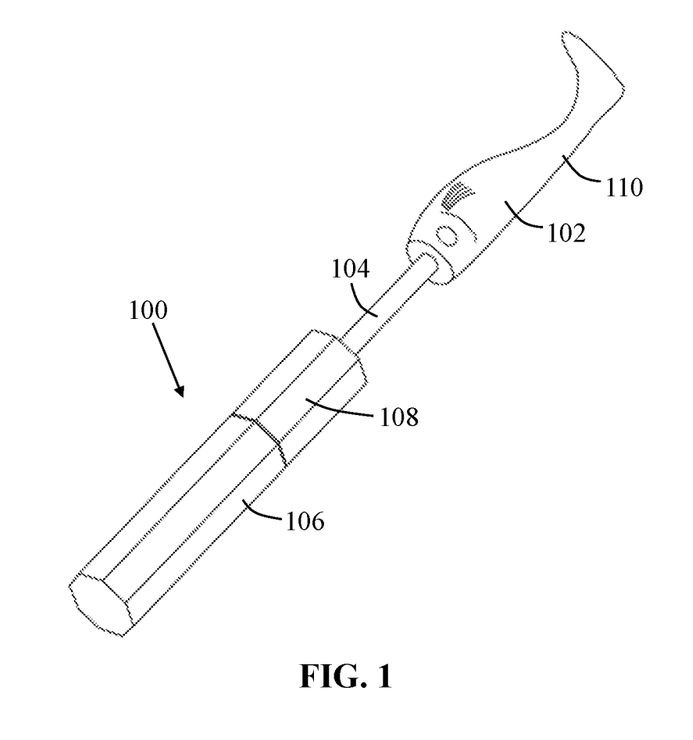
FIG. 1 is a perspective view of a rattle insertion device inserted into an elastomeric fishing lure in accordance with one embodiment of the present invention.
Figure 2:
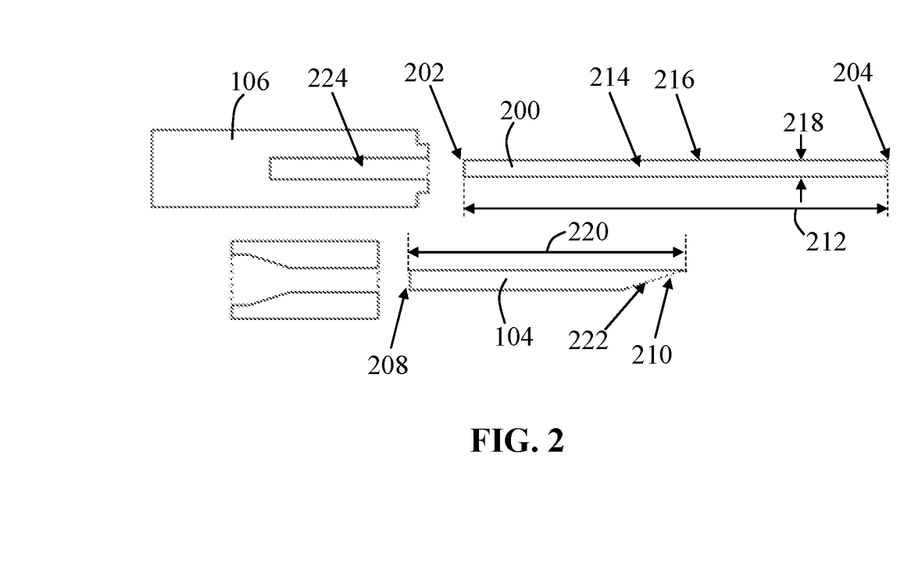
FIG. 2 depicts an elevational exploded view of a push rod member above an elevational exploded view of a needle member, respectively, utilized with the rattle insertion device in accordance with one embodiment of the present invention.

The present invention provides a novel and efficient rattle insertion device operable to inject a rattle member effectively and efficiently into an elastomeric fishing lure. Elastomeric is generally known as elastic substance capable of deforming and returning in shape and may occur naturally, e.g., natural rubber, or may be produced synthetically, e.g., butyl rubber or neoprene. Referring now to FIGS. 1-2, one embodiment of the present invention is shown in a perspective and elevational views, respectively. FIGS. 1-2, along with the other figures herein, show several advantageous features of the present invention, but, as will be described below, the invention can be provided in several shapes, sizes, combinations of features and components, and varying numbers and functions of the components. The first example of a rattle insertion device 100 for an elastomeric fishing lure 102, as shown in FIGS. 1-4, includes a push rod member 200, a needle member 104, and a rattle member 404 that is operable with the needle member 104 and the push rod member 200 to be inserted into an elastomeric or other lure 102.

Figure 3:
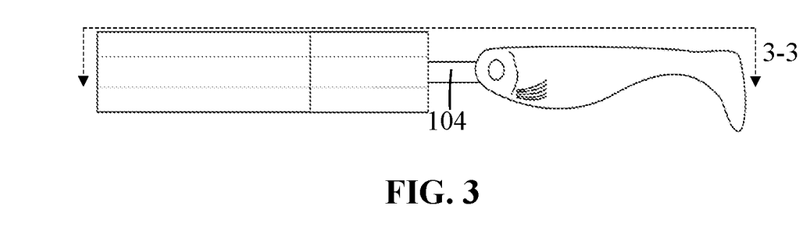
FIG. 3 is an elevational side view of a rattle insertion device inserted into an elastomeric fishing lure in accordance with one embodiment of the present invention.
Figure 4:
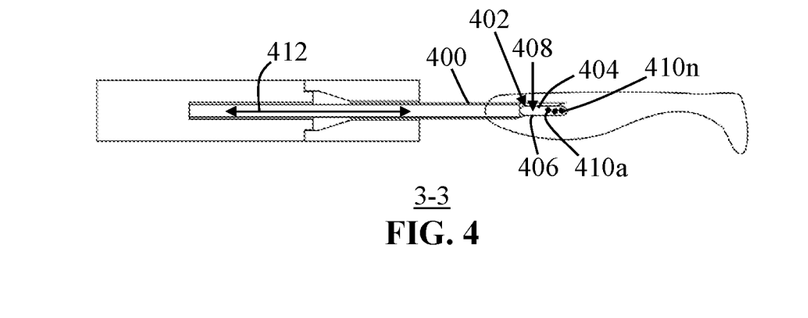
FIG. 4 is a cross-sectional view of the rattle insertion device and the elastomeric fishing lure depicted in FIG. 3 and along section line 3-3 in accordance with one embodiment of the present invention.

The push rod member 200 can be seen having a first rod end 202 (which may be the terminal end), a second rod end 204 (which may be the terminal end) opposing the first rod end 202, and a rod member length 212 (e.g., approximately 1-6 inches) separating the first and second rod ends 202, 204. The second rod end 204 may be considered "free", in that is not structurally attached to any auxiliary structure. The push rod member 200 may be elongated in shape to efficiently and effectively initiate and cause transport the rattle member 404. The push rod member 200 also includes a rod outer surface 214 that may be substantially smooth to facilitate movement of the push rod member 200 within the needle member 104. FIG. 1 depicts the push rod member 200 and the needle member 104 directly coupled together with a handle member 106 attached to the push rod member 200 and a needle adapter body 108 attached to needle member 104. Specifically, FIG. 1, like FIGS. 3-4, depict the push rod member 200 inserted within a needle channel 402 defined by the needle member.

The push rod member 200 may also include an insertion rod portion 216 disposed along the rod member length 212 and include a rod diameter 218 separating opposing sides of the rod outer surface 214 that may uniformly span the insertion rod portion 216 and/or the entire rod member length 212. The push rod member 200 may also include the second rod end 204 that is preferably utilized to directly cause transportation of the rattle member 404 through the needle channel 402 and out through the needle opening 222.

Specifically, the needle member 104 includes a first needle end 208 (which may be the terminal end), a second needle end 210 (which may be the terminal end) opposing the first needle end 208, and a needle wall 400 defining a needle channel 402. As used herein, the term "wall" is intended broadly to encompass continuous structures, as well as, separate structures that are coupled together so as to form a substantially continuous external surface. The second needle end 210 is preferably sharp enough to penetrate an elastomeric material, e.g., natural rubber. In one embodiment, the needle member 104 tapers in thickness to define a tapered point (as depicted in the figures). The needle channel 402 may span, for example, approximately 1-6 inches and have a channel diameter 500 that may be cylindrical and may be greater than the rod diameter 218 to permit the insertion rod portion 216 to be inserted therein. The channel diameter 500 may uniformly span the entire length of the needle channel 402 (at least until reaching the needle opening 222). The channel diameter 500 is also greater than a rattle diameter 504 defined by the rattle member 404.

In one embodiment, the needle opening 222 may be disposed at the terminal portion of the second needle end 210 while, in other embodiments, it may be defined and disposed along another portion of the needle length 220 separating the first and second needle ends 208, 210. The needle length 220 may span approximately 1-6 inches or another length to preferably reach a center of mass and/or centroid of the fishing lure 102. Preferably, however, the needle opening 222 is disposed at least proximal to (i.e., at or near, within 10% of the overall length) of the second needle end 210.

The rattle member 404 may be disposed within the needle channel 402 for insertion into the lure body 110 of the fishing lure 102. The rattle member 404 may have a substantially rigid ("rigid") rattle member wall 406, include a rattle outer surface 502, include a rattle diameter 504 (e.g., approximately 0.1-0.5 inches) separating opposing sides of the rattle outer surface 502 and that is less than the channel diameter 500 (e.g., approximately 0.2-0.6 inches) and the needle opening 222, thereby enabling smooth and effective transportation of the rattle member 404 within the needle channel 402. As appreciated by the those of skill in the art, the rattle member wall 406 may be of a metallic material such as aluminum or stainless steel, a polymeric material such as PVC, a glass material, ceramic material, or a combination of the same.

The rattle member 404 defines a rattle cavity 408 encapsulating one or more rigid noise particles 410a-n therein, wherein "n" represents any number greater than one. The noise particles 410a-n may be operably configured to be freely mobile within the rattle cavity 408 and may be also of a rigid material that causes noise when colliding with the rattle member wall 406.

As such, the push rod member 200 is operably configured to translate within the needle channel 402 along a rod translation path (reflected with arrow 412) to transport the rattle member 404 through the needle channel 402, out through the needle opening 222, and into the lure body 110, thereby providing an effective and efficient tool for creating these much desired noise-making lures.

Figure 5:
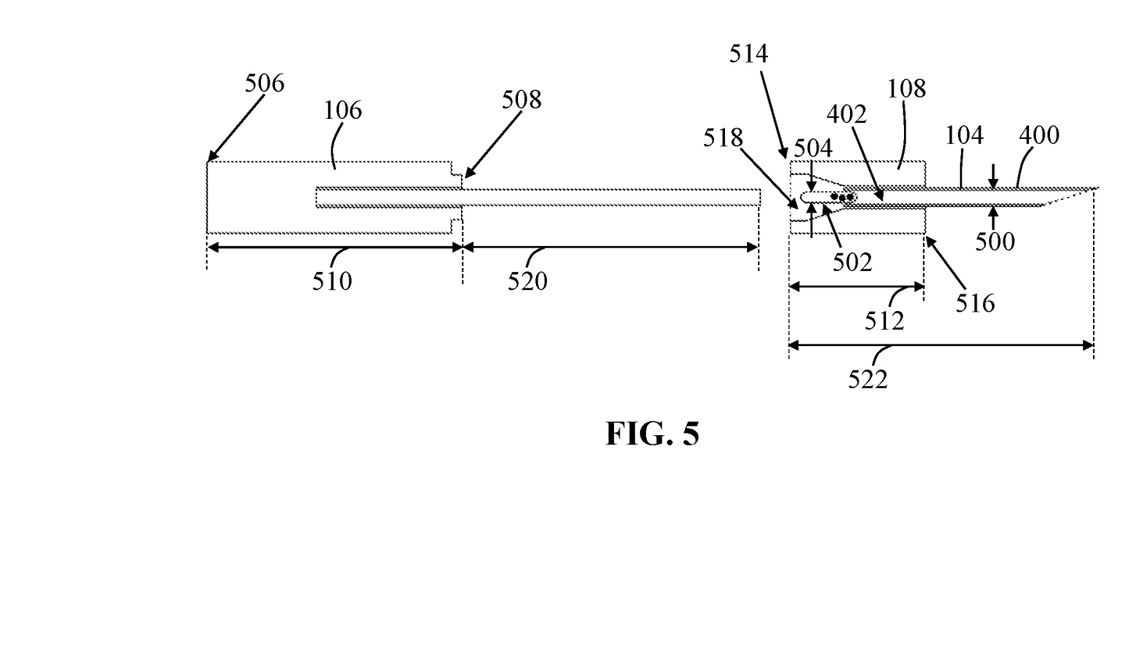
FIG. 5 is an elevational view of the push rod member and cross-sectional view of the needle member with a rattle member disposed therein in accordance with one embodiment of the present invention.

In one embodiment and with reference to FIG. 2 and FIG. 5, the push rod member 200 beneficially includes a handle member 106 shaped and sized for grasping (e.g., 1-3 inches in diameter). The handle member 106 may also include or be made of a gripping material (leather, natural rubber, neoprene, etc.) for comfort and ease of holding and manipulation. The handle member 106 may define an internal channel 224 with the first rod end 202 and a portion of the rod length 212 disposed therein, wherein the push rod member 200 may be securely coupled to the handle member 106 using adhesive, sonic welding, and/or one or more fasteners. The handle member 106 also includes a first handle end 506, a second handle end 508 opposing the first handle end 506, and a handle length 510 separating the first and second handle ends 506, 508 (e.g., spanning approximately 1-5 inches).

Similar to the handle member 106, the needle adapter body 108 may also be securely coupled to the needle member 104 and may have a first adapter end 514, a second adapter end 516 opposing the first adapter end 514, and an adapter length 512 separating the first and second adapter ends 514, 516 (e.g., spanning approximately 1-3 inches). The second handle end 508 and the first adapter end 514 may be operably configured to be directly and matingly couple to one another in a male-female configuration. For example, the handle member 106 and needle adapter body 108 may configured with corresponding shapes, connectable with fasteners, and/or the second handle end 508 may be configured in a male configuration and the first adapter end 514 is configured in a female configuration, thereby facilitating a secure and/or effective coupling of the handle member 106 and the needle adapter body 108.

In one embodiment, the needle adapter body 108 defines a tapered insertion channel 518 spanning from the first adapter end 514 and along the adapter length 512. The insertion channel 518 facilitates in more effectively and efficiently introducing and moving the rattle member 404. The needle adapter body 108 may also beneficially include an internal diameter of the tapered insertion channel 518 less than a diameter of the second handle end 508, thereby acting as a stop for the handle member 106 when inserted into the needle adapter body 108 and/or providing the user an indication of when the push rod member 200 has travelled the necessary distance without damaging the lure 102.

In one embodiment, the insertion rod portion 216 spans from the second handle end 508 to the second rod end 204 to define a rod insertion length 520 sufficient to reach the needle opening 222. Said another way, the rod insertion length 520 is greater than or equal to a total needle opening length 522 separating the first needle end 208 and the terminal portion of the needle opening 222. Further, the needle adapter body 108 may be securely coupled to the needle member 104 and may have a first adapter end 514, a second adapter end 516 opposing the first adapter end 514, and an adapter length 512 separating the first and second adapter ends 514, 516, wherein the rod insertion length 520 is greater than or equal to a total needle opening length 522 separating the first adapter end 514 and the terminal portion of the needle opening 222. This also beneficially effectuates insertion of the push rod member 200 and transportation and placement of the rattle member 404 (which may also be beneficially of an elongated shape).

Figure 6:
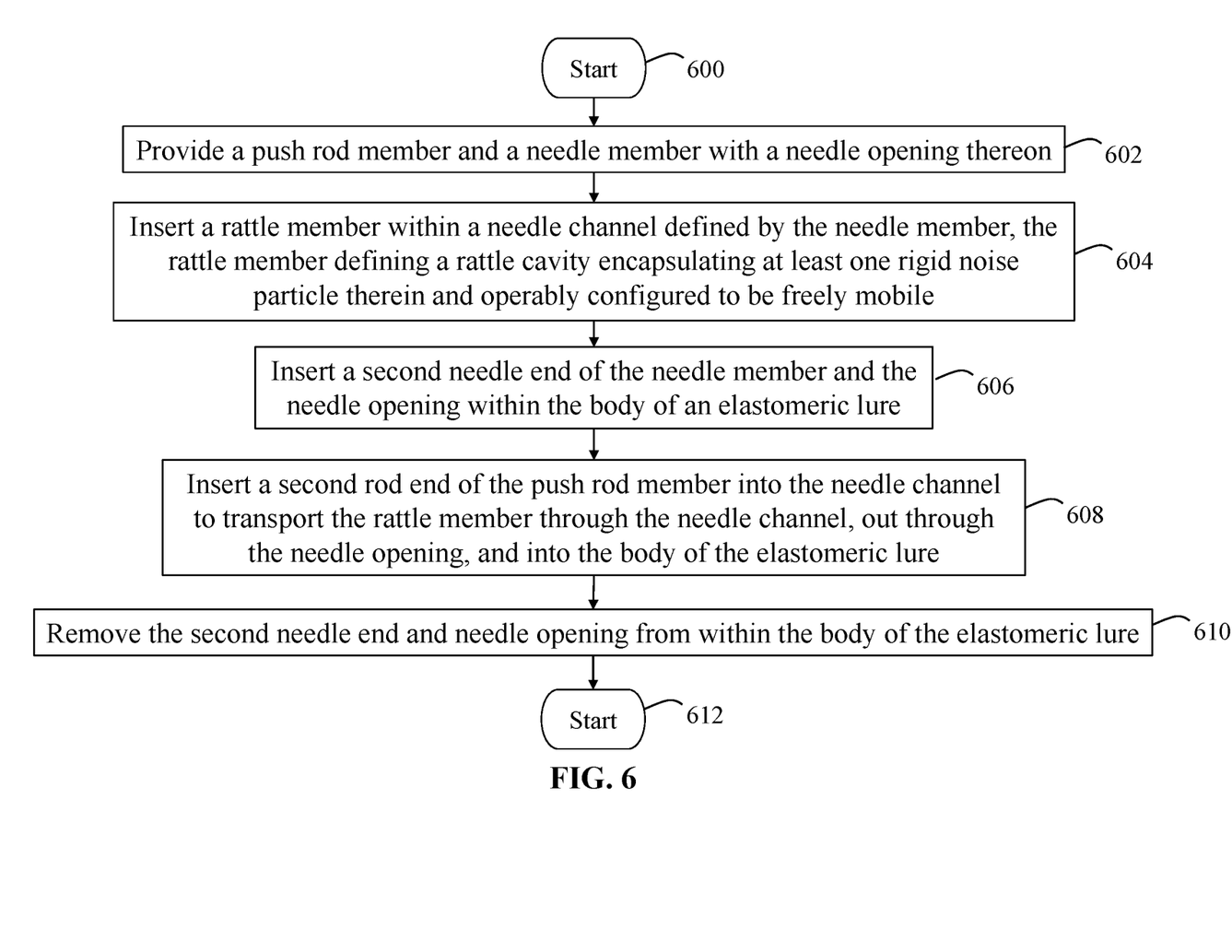
FIG. 6 is a process-flow diagram depicting an exemplary method of utilizing a rattle insertion device with an elastomeric fishing lure in accordance with one embodiment of the present invention.

With respect to FIG. 6, a process flow diagram is depicted to show an exemplary method of inserting a rattle into an elastomeric fishing lure. FIG. 6 will be described in conjunction with the above-referenced disclosure and other figures depicted herein. Although FIG. 6 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 6 for the sake of brevity. In some embodiments, some or all of the process steps included in FIG. 6 can be combined into a single process.

The process may begin at step 600 and immediately proceed to the step 602 of providing a push rod member with a first rod end, a second rod end opposing the first rod end, a rod member length separating the first and second rod ends, a rod outer surface, and an insertion rod portion disposed along the rod member length and including the second rod end. Additionally, step 602 of providing a needle member with a first needle end, a second needle end opposing the first needle end, a needle wall defining a needle channel, a needle length separating the first and second needle ends, and a needle opening disposed along the needle length. The push rod member and the needle member would be disconnected from one another.

Next, step 604 includes inserting a rattle member within the needle channel, wherein the rattle member includes a rigid rattle member wall with a rattle outer surface and defines a rattle cavity encapsulating at least one rigid noise particle therein and operably configured to be freely mobile. Step 606 includes inserting the second needle end and needle opening within the body of an elastomeric lure to a desired length, e.g., toward the center of mass or centroid of the fishing lure.

Next, step 608 includes the user inserting the second rod end into the needle channel to transport the rattle member through the needle channel, out through the needle opening, and into the body of the elastomeric lure. At that point, the material of the elastomeric lure will retain and/or compress the rattle member. Next, step 610 would include removing the second needle end and needle opening from within the body of the elastomeric lure. The process may terminate at step 612.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A rattle insertion device for an elastomeric fishing lure comprising:
   a push rod member with a first rod end, a second rod end opposing the first rod end, a rod member length separating the first and second rod ends, a rod outer surface, an insertion rod portion disposed along the rod member length, having a rod diameter separating opposing sides of the rod outer surface, and including the second rod end;

a handle member shaped and sized for grasping and defining an internal channel with the first rod end and a portion of the rod length disposed therein, the push rod member securely coupled to the handle member;

a needle member with a first needle end, a second needle end opposing the first needle end, a needle wall defining a needle channel with a channel diameter greater than the rod diameter, a needle length separating the first and second needle ends, and a needle opening disposed along the needle length; and a rattle member disposed within the needle channel, with a rigid rattle member wall having a rattle outer surface, having a rattle diameter separating opposing sides of the rattle outer surface and less than the channel diameter and the needle opening, and defining a rattle cavity encapsulating at least one rigid noise particle therein and operably configured to be freely mobile, the push rod member operably configured to translate within the needle channel along a rod translation path to transport the rattle member through the needle channel and out through the needle opening.

2. The rattle insertion device according to claim 1, wherein:
the needle opening is disposed at the terminal portion of the second needle end and the second needle end defines a tapered point.

3. The rattle insertion device according to claim 1, further comprising:
a needle adapter body securely coupled to the needle member and having a first adapter end, a second adapter end opposing the first adapter end, and an adapter length separating the first and second adapter ends, the second handle end and the first adapter end operably configured to be directly and matingly coupled to one another in a male-female configuration.

4. The rattle insertion device according to claim 3, wherein:
the second handle end is configured in a male configuration, the first adapter end is configured in a female configuration, and the needle adapter body defines a tapered insertion channel spanning from the first adapter end and along the adapter length.

5. The rattle insertion device according to claim 4, wherein the needle adapter body further comprises:
an internal diameter of the tapered insertion channel less than a diameter of the second handle end.

6. The rattle insertion device according to claim 1, wherein:
the handle member has a first handle end, a second handle end opposing the first handle end, a handle length separating the first and second handle ends, the insertion rod portion spanning from the second handle end to the second rod end to define a rod insertion length sufficient to reach the needle opening.

7. The rattle insertion device according to claim 6, wherein:
the rod insertion length is greater than or equal to a total needle opening length separating the first needle end and the terminal portion of the needle opening.

8. The rattle insertion device according to claim 6, further comprising:
a needle adapter body securely coupled to the needle member and having a first adapter end, a second adapter end opposing the first adapter end, and an adapter length separating the first and second adapter ends, wherein the rod insertion length is greater than or equal to a total needle opening length separating the first adapter end and the terminal portion of the needle opening.

9. The rattle insertion device according to claim 8, wherein:
the second handle end and the first adapter end are operably configured to be directly and matingly coupled to one another in a male-female configuration.

10. The rattle insertion device according to claim 1, wherein the rattle member further comprises:
a plurality of rigid noise particles encapsulated within the rattle cavity, wherein the rattle member is of an elongated shape.

11. A method of inserting a rattle into an elastomeric fishing lure comprising the steps of:
providing a push rod member with a first rod end, a second rod end opposing the first rod end, a rod member length separating the first and second rod ends, a rod outer surface, an insertion rod portion disposed along the rod member length and including the second rod end, and with a handle member shaped and sized for grasping and defining an internal channel with the first rod end and a portion of the rod length disposed therein, the push rod member securely coupled to the handle member;

providing a needle member with a first needle end, a second needle end opposing the first needle end, a needle wall defining a needle channel, a needle length separating the first and second needle ends, and a needle opening disposed along the needle length;

inserting a rattle member within the needle channel, the rattle member having a rigid rattle member wall with a rattle outer surface and defining a rattle cavity encapsulating at least one rigid noise particle therein and operably configured to be freely mobile;

inserting the second needle end and needle opening within the body of an elastomeric lure;

inserting the second rod end into the needle channel to transport the rattle member through the needle channel, out through the needle opening, and into the body of the elastomeric lure; and removing the second needle end and needle opening from within the body of the elastomeric lure.

12. The method according to claim 11, further comprising:
providing the push rod member with a rod diameter defined thereon and separating opposing sides of the rod outer surface;
providing the needle member with a needle channel defined thereon and with a channel diameter greater than the rod diameter; and
providing the rattle member with a rattle diameter defined thereon and separating opposing sides of the rattle outer surface and less than the channel diameter and the needle opening.

13. The method according to claim 11, wherein:
the needle opening is disposed at the terminal portion of the second needle end and the second needle end defines a tapered point.

14. The method according to claim 11, further comprising:
providing the handle member with a first handle end, a second handle end opposing the first handle end, and a handle length separating the first and second handle ends; and
providing a needle adapter body securely coupled to the needle member and having a first adapter end, a second adapter end opposing the first adapter end, and an adapter length separating the first and second adapter ends, the second handle end and the first adapter end operably configured to be directly and matingly coupled to one another in a male-female configuration.

15. The method according to claim 14, wherein:
the second handle end is configured in a male configuration, the first adapter end is configured in a female configuration, and the needle adapter body defines a tapered insertion channel spanning from the first adapter end and along the adapter length.

16. A rattle insertion device for an elastomeric fishing lure comprising:
- a push rod member with a first rod end, a second rod end opposing the first rod end, a rod member length separating the first and second rod ends, a rod outer surface, an insertion rod portion disposed along the rod member length, having a rod diameter separating opposing sides of the rod outer surface, and including the second rod end;
- a handle member securely coupled to the push rod member and having a first handle end, a second handle end opposing the first handle end, a handle length separating the first and second handle ends, the insertion rod portion spanning from the second handle end to the second rod end to define a rod insertion length sufficient to reach the needle opening;
- a needle member with a first needle end, a second needle end opposing the first needle end, a needle wall defining a needle channel with a channel diameter greater than the rod diameter, a needle length separating the first and second needle ends, and a needle opening disposed along the needle length; and
- a rattle member disposed within the needle channel, with a rigid rattle member wall having a rattle outer surface, having a rattle diameter separating opposing sides of the rattle outer surface and less than the channel diameter and the needle opening, and defining a rattle cavity encapsulating at least one rigid noise particle therein and operably configured to be freely mobile, the push rod member operably configured to translate within the needle channel along a rod translation path to transport the rattle member through the needle channel and out through the needle opening.

* * * * *